United States Patent
Anderson et al.

(10) Patent No.: US 8,656,946 B2
(45) Date of Patent: Feb. 25, 2014

(54) VALVES

(75) Inventors: Robert William Anderson, Stocksfield (GB); Neil Colin Kennedy, Prudhoe (GB)

(73) Assignee: Anson Limited (GB)

( * ) Notice: Subject to any disclaimer, the term of this patent is extended or adjusted under 35 U.S.C. 154(b) by 972 days.

(21) Appl. No.: 12/601,464

(22) PCT Filed: May 22, 2008

(86) PCT No.: PCT/GB2008/001747
§ 371 (c)(1),
(2), (4) Date: Nov. 23, 2009

(87) PCT Pub. No.: WO2008/142415
PCT Pub. Date: Nov. 27, 2008

(65) Prior Publication Data
US 2010/0170571 A1   Jul. 8, 2010

(30) Foreign Application Priority Data
May 23, 2007 (GB) .................................. 0709906.2

(51) Int. Cl.
*F16K 15/00* (2006.01)
(52) U.S. Cl.
USPC ................. 137/513; 137/614.18; 137/614.19; 251/82; 251/149.6; 251/339
(58) Field of Classification Search
USPC ......... 137/322, 512, 512.5, 513, 613, 614.04, 137/614.11, 614.18, 614.19, 614.2; 251/77, 251/82, 149.6, 339; 184/105.3
See application file for complete search history.

(56) References Cited

U.S. PATENT DOCUMENTS

| 1,409,116 A | | 3/1922 | Sammis |
| 1,580,618 A | * | 4/1926 | Lovequist et al. ....... 137/630.22 |
| 2,056,133 A | | 9/1936 | Corey |
| 2,442,642 A | | 6/1948 | Eckel |
| 2,702,044 A | * | 2/1955 | Johnston ...................... 137/102 |
| 2,724,555 A | | 11/1955 | Roetter |
| 2,764,175 A | * | 9/1956 | Mercier et al. ................ 137/109 |
| 3,447,564 A | | 6/1969 | North et al. |

(Continued)

FOREIGN PATENT DOCUMENTS

| DE | 461013 C | 6/1928 |
| GB | 554777 | 7/1943 |
| JP | 2005077275 A | 3/2005 |

OTHER PUBLICATIONS

PCT/GB2008/001747 International Search Report, Sep. 9, 2008.

(Continued)

*Primary Examiner* — Craig Schneider
*Assistant Examiner* — Matthew W Jellett
(74) *Attorney, Agent, or Firm* — Conley Rose, P.C.

(57) ABSTRACT

A double check valve (10) with two separate elements (20, 25) individually movable to close the valve and collectively movable to open the valve. The separate elements are independently closing the valve, and collectively controllable to open the valve, to allow pressure release or to allow injection of fluid (e.g. lubricant). In an example, the double check valve includes two separate check valves with a stinger element (30) between them which is operable to internally sting the one check valve when (e.g. by action of) the other check valve is stung by a user (e.g. using a stinger means) thereby to open both check valves individually and the double check valve as a whole.

18 Claims, 2 Drawing Sheets

(56) References Cited

U.S. PATENT DOCUMENTS 4,354,523 A * 10/1982 Hochmuth et al. ...... 137/614.18
4,392,507 A * 7/1983 Harris ............................. 137/38
4,591,298 A * 5/1986 Fukumori et al. ............ 405/282
6,206,032 B1 * 3/2001 Hill ............................ 137/539.5

OTHER PUBLICATIONS

UKIPO Search Report for GB 0709906.2, Sep. 1, 2007.

* cited by examiner

VALVES

CROSS-REFERENCE TO RELATED APPLICATIONS

The present application claims the benefit of priority to PCT/GB2008/001747 filed May 22, 2008, which claims the benefit of British Application No. 0709906.2 filed May 23, 2007, both of which are incorporated herein by reference in their entirety for all purposes.

STATEMENT REGARDING FEDERALLY SPONSORED RESEARCH OR DEVELOPMENT

Not applicable.

The present invention relates to valves, such as check valves, and particularly, though not exclusively, relates to lubrication fittings for use in lubricating pressurised vessels or cavities.

There are currently many different types of lubrication fittings providing a means to inject lubricant into pressurised vessels while also providing a means of retaining the lubricant within the vessel in question. For example, a lubrication fitting, fitted to a vessel to be internally lubricated, may function as a simple check valve allowing a flow of lubricant from an opening of the valve external to the vessel, to an opening of the valve internal to the vessel thereby to permit lubricant to be injected into the vessel by forcing the lubricant from the external opening to the internal opening and thereafter into the vessel itself. Many such valves comprise a simple one-way check valve mechanism allowing the flow of lubricant into the vessel while preventing the flow of lubricant out of the vessel via the fitting.

For example, FIG. 1 illustrates a simple such lubrication fitting including a one-way check valve mechanism. The lubrication fitting comprises a valve body 1 through which passes a valve bore 2 from an outer valve opening 3 serving as a lubricant inlet opening, to an inner valve opening 4 serving as a lubricant outlet. A helical spring 5 is housed within the valve bore and arranged to urge a spherical ball 6 against a valve seat 7 adjacent the first valve opening such that the spherical ball closes the valve when so seated. In use, the fitting is attached to a pressurised vessel or cavity such that the inner valve opening is placed in fluid communication with the internal volume of the vessel while the outer valve opening is in communication with regions outside the vessel. The action of the helical spring to urge the spherical ball into the seated position closes the valve preventing the escape of pressurised fluid (e.g. lubricant) from within the pressurised vessel via the valve bore.

Lubricant may be injected into the pressurised vessel by unseating the spherical ball from the valve seat (i.e. moving the spherical ball towards the inner valve opening) thereby to open the valve and to direct the passage of pressurised lubricant from the outer valve opening to the inner valve opening, via the valve bore, and then into the vessel or cavity to be lubricated. Unseating of the spherical ball may be achieved by inserting an end of a pin or rod into the outer valve opening and into contact with the exposed outer surface of the spherical ball. Pushing the inserted end of the rod or pin against the ball with sufficient force unseats the ball. This process of unseating the ball of such a valve is commonly known as "stinging" the valve, and the rod or pin is commonly known as a "stinger" or part of a "stinger" means.

In this way, the lubrication fitting acts as a means of allowing the injection of lubricant into a pressurised vessel while preventing fluids or substances from escaping from within the pressurised vessel. This is especially important when pressures involved are high.

For example, a vessel such as a gate valve or a plug valve typically requires filling with a lubricant. In extreme cases, pressures from within such vessels may be as high as 30,000 p.s.i.

Pressurised fluid vessels or cavities may often include internal valves such as gate valves or plug valves which include moving components requiring lubrication. It is not uncommon for trapped pressures within such vessels and cavities to act on the internal mechanism of the valve (e.g. the gate or the plug) with such force as to clamp the moving members such that they can no longer be moved by use of the ordinary means for opening and closing the valve mechanism. Under such circumstances, a means is required to release unwanted internal pressures from within the body of the vessel or cavity in order to unclamp the otherwise movable internal valve mechanisms to allow the valve to be operated. In such situations, or for any other situation requiring release of pressures from within a vessel or cavity, the vessel or cavity may be depressurised if it is fitted with an appropriate lubrication fitting such as illustrated in FIG. 1, by unseating the spherical ball to open the valve and depressurise the vessel or cavity.

Of course, in normal use, the body of a lubrication fitting such as illustrated in FIG. 1, is internally subjected to the pressures within the vessel to which it is fitted. The seated spherical ball within the valve seat of the fitting aims to prevent escape of pressure. However, such a simple mechanism is vulnerable to failure when internal vessel pressures are high.

The present invention aims to provide a valve with reduced vulnerability to such failures whilst still being usable as a check valve and/or as a lubrication fitting for use in lubricating pressurised vessels or cavities.

At its most general, the invention proposed is a double check valve with two separate elements individually movable to close (e.g. individually but simultaneously or concurrently close) the valve and collectively movable to open the valve. In this way, the valve may be less vulnerable to failure or leakage in having separate elements for independently (e.g. concurrently) closing the valve, yet being collectively controllable to open the valve to allow pressure release or to allow injection of fluid (e.g. lubricant). For example, the double check valve may include two separate check valves with a "stinger" element between them which is operable to internally "sting" the one check valve when (e.g. by action of) the other check valve is "stung" by a user (e.g. using a stinger means) thereby to open both check valves individually and the double check valve as a whole.

In a first of its aspects, the invention may provide a valve including a valve body through which a valve bore passes from a first valve opening to a second valve opening, a first closure member moveable within the valve bore to close the valve, a second closure member moveable within the valve bore to close the valve (e.g. concurrent closure when the valve is also or already closed by the first closure means), a rigid intermediate member within the valve bore between the first closure member and the second closure member and moveable by action of movement of the second closure member to urge movement of (and preferably move) the first closure member to render the first valve opening in fluid communication with the second valve opening.

For example, each of the first and second closure members may be dimensioned and arranged to be movable to a respective position within the valve bore in which the respective closure member engages with an internal surface of the valve bore to sealing prevent fluid communication between the first and second valve openings. As such, each of the first and second closure members may independently close the valve. In this way, failure of the closed valve would require failure of the first and the second closure members separately.

Nevertheless, each of the first and second closure members may be movable along the valve bore collectively and in unison such that movement of the second closure member away from the location within the valve bore at which it closes the valve, also results in a movement of the first closure member away from its valve-closing position. Thus, pushing the second closure member away from its valve-closing position may cause the second closure member to urge against the nearmost surface of the rigid intermediate member thereby to urge that intermediate member against the first closure member and to urge the first closure member away from its valve-closing position. Thus, the user may render the valve open by only applying action upon the second closure member. The first and/or second closure member may be a spherical ball of rigid metal or other rigid and sufficiently strong material. The rigid intermediate member may be a pin or rod or other elongate body positioned within the valve bore to extend along the axis of the bore between the first and second closure members. The valve bore preferably has a diameter which decreases in value as the bore extends from the first valve opening to the second valve opening. The first closure member may be dimensioned to be movable within a first section of valve bore adjacent the first valve opening, but too large to pass along the valve bore beyond (i.e. further towards the second valve opening) the position along the valve bore at which it closes the valve. The second closure member may be dimensioned to be movable along those portions of the valve bore along which the first closure member is movable, and also along a narrower section of the valve bore along which the first closure member cannot pass. The second closure member may be dimensioned to prevent it passing along a section of the valve leading to or immediately adjacent the second valve opening. In this way both the first and second closure members may be movable along the valve bore towards the second valve opening, such that passage of the first closure member along the valve bore is blocked at a point further from the second valve opening (closer to the first valve opening) than the position at which continued passage of the second closure member is blocked. The second closure member may have a dimension transverse to the axis of the valve bore which is less than the dimension of the first closure member transverse to the axis of the valve bore.

The rigid intermediate member may be dimensioned to be not placeable in contact with both the first closure member and the second closure member simultaneously (but very close to being so) when both the first and second closure members are in a respective position within the valve bore which closes the valve. Consequently, a small movement of the second closure member substantially immediately away from its valve-closing position will result in an urging by the intermediate member of a movement of the first closure member from its valve-closing position. This dimensioning of the rigid intermediate member ensures that it does not prevent the simultaneous closure of the valve by both of the first and second closure members. It is preferable that the rigid intermediate member is dimensioned such that it is placeable in contact with one of the first and second closure members when each closure member is in a respective position within the valve bore which closes the valve while being intimately close to, but not in contact with, the other of the first and second closure members. When so placed, the spacing between the opposing adjacent nearmost surfaces of the intimately close rigid intermediate member and closure member may be less than 5%, or 4%, or 3%, or 2%, or preferably 1% of the axial length of the rigid intermediate member. This spacing may be less than 1 mm or less than 0.5 mm, or less than 0.1 mm. The opening of the valve may be finely controlled as a result.

The rigid intermediate member may be dimensioned to be in contact with both the first closure member and the second closure member only after the second closure member is displaced from a position within the valve bore which closes the valve. In this way, the valve may be opened in stages, by first unseating the second closure member and only permitting a subsequent unseating of the first closure member with the second closure member fully unseated. This enables release of pressure in the volume of the valve bore between the first and second closure members before releasing pressure behind the first closure member.

The rigid intermediate member may have a major axial length not greater than the distance between nearmost opposing surfaces of the first and second closure members when both closure members are in respective positions within the valve bore which close the valve. This axial length may substantially match the aforesaid distance, or may be less than that distance. Most preferably the rigid intermediate member is dimensioned to be not in physical contact with both of the first and second closure members simultaneously when the valve is closed by both closure members.

The rigid intermediate member may have an axially transverse width less than the width of the portion of the valve bore between the first and second closure members therein.

Preferably, the material from which the rigid intermediate member is made is softer than the material from which each/either of the first and second closure members are made. This aims to prevent damage being caused to the seating surfaces of the closure members by the rigid intermediate member by contact between them. The material of the rigid intermediate member and/or the closure members is most preferably resistant (i.e. to corrosion) to the substance retained/inserted within the vessel served by the valve.

The material of the valve body, the closure members and the intermediate rigid member may be a plastic, a metal or a ceramic.

The rigid intermediate member may be a metal or ceramic rod or pin, or a plastic rod or pin made from sufficiently strong plastic material. The body of the valve may be made from ferric or non-ferric steel, brass, bronze or an aluminium alloy. The, or either of the, valve closure members may be made from ferric or non-ferric steel, brass, bronze, aluminium alloy, elastomer, ceramic, tungsten carbide or a plastic. The appropriate choice of materials for the parts will depend to some extent upon the type of fluid (e.g. liquid or gas) being retained and the pressure involved.

The valve bore may define a first valve seat and the first closure member may be moveable within the valve bore to engage the first valve seat and dimensioned to close the valve when so seated.

The rigid intermediate member may be moveable by action of a movement of the second closure member towards the first valve seat to urge movement of the first closure member away from the first valve seat.

The valve bore may define a second valve seat and the second closure member may be located between the first and second valve seats and may be moveable within the valve bore to engage the second valve seat and dimensioned to close the valve when so seated. When so seated, either or both of the first and second closure members may sealingly interface with respective valve seats to form a circumferentially closed, sealing interface fully isolating the parts of the valve bore either side of the interface.

Each of the first and second closure members may be moveable by action of a fluid pressure within the valve bore to a respective static position (e.g. the seated position described above) within the valve bore which closes the valve.

The valve may include urging means arranged to urge the first and/or second closure member(s) to a position(s) within the valve bore which closes the valve. The urging means may include a spring or springs housed within the valve bore and bearing against the first and/or second valve closure member(s) to urge the respective closure member into the aforesaid position(s). The urging means may include a first spring bearing against the first closure member to urge that closure member to a valve-closing position, and may include a second spring located within the valve bore between the first and second closure members and arranged to bear against the first closure member to urge it into a position which closes the valve.

The diameter (or transverse dimension) of any part of the valve bore may be a value from the range ⅛ inch to ½ inch (0.3175 cm to 1.27 cm), and the diameters (or transverse dimension) of either of the first and second closure members may be a value within the above range. The length of the valve bore may be a value from the range ½ to 1 inch (1.27 cm to 2.54 cm). The compression strength of the first spring is preferably greater than the compression strength (i.e. resistance to compression, stiffness) of the second spring.

Preferably, when the first and second closure members are in respective positions within the valve bore which each close the valve, the urging force applied to the first closure member by the urging means is greater than the urging force applied to the second closure member by the urging means. The second spring may bear against the first and second closure members, being located between them. The suitable choice of urging force and/or compression strength described above may ensure that the urging force of the urging means does not unseat the first closure member.

Where the urging means includes a spring located between the first and second closure members, the spring may be a helical spring within the windings of which is housed the rigid intermediate member. In this way, the windings of the helical spring may act as a cage retaining the rigid intermediate member in a desired position in between the first and second closure members. Where the urging means includes a spring urging the first closure member into its valve-closing position, the end of the spring furthest from the first closure member may be seated against a spring-seating arranged within the valve bore adjacent or immediately adjacent the first valve opening. For example, the diameter of the first valve opening may be less than the diameter of the valve bore immediately adjacent the opening, wherein the first valve opening is defined by a circumferential lip extending over the peripheral edges of the valve bore to reduce the aperture of the valve bore at the first valve opening. The inwardly-facing surface of this lip may act as a seat against which the distal end of a spring may be seated to act as a means of urging the first closure member into its valve-closing position.

In another of its aspects, the invention may provide a check valve including the valve according to the invention in its first aspect. In a further of its aspects, the invention may provide a gate valve, or a plug valve, or a globe valve, or a ball valve including the valve of any preceding aspect of the invention.

In an additional aspect, the invention may provide a lubrication fitting including a valve according to the invention in any of the above aspects in which the valve bore is a lubricant conduit, or is arranged to be a lubricant conduit.

In yet a further of its aspects, the invention may provide a means for decompressing a pressurised region, vessel or cavity including a valve according to any preceding aspect described above. The invention may provide a valve or a vessel containing or for containing pressurised substance including the valve according to any aspect above.

It will be understood that the invention described above in its various aspects implements an equivalent method of controlling fluid communication between a pressurised region, vessel or cavity and a region of relatively lower pressure. The invention encompasses such equivalent methods.

In a second of its aspects, the invention may provide a method of controlling fluid communication with a pressurised region including, providing a valve body through which a valve bore passes from a first valve opening in communication with the pressurised region to a second valve opening, providing a first closure member moveable within the valve bore (e.g. by action of fluid pressure therein) to close the valve, providing a second closure member moveable within the valve bore (e.g. by action of fluid pressure therein) to close the valve (e.g. concurrent closure when the valve is also or already closed by the first closure means), providing a rigid intermediate member within the valve bore between the first closure member and the second closure member and moving the rigid intermediate member by action of moving the second closure member to urge movement of (and preferably move) the first closure member to render the first valve opening in fluid communication with the second valve opening.

The invention may provide a method of releasing pressure from a pressurised cavity according to the invention in its second aspect.

The method may include providing a first valve seat defined by the valve bore, and moving the first closure member within the valve bore from a position of engagement with the first valve seat thereby to unseat the first closure member therefrom.

The method may include moving the rigid intermediate member by action of moving the second closure member towards the first valve seat to urge movement of the first closure member away from the first valve seat.

The method may include providing a second valve seat defined by the valve bore and moving the second closure member within the valve bore from a position of engagement with the second valve seat thereby to unseat the second closure member therefrom.

The moving of each of the first and second closure members may be achieved by action of a fluid pressure within the valve bore to a respective static position within the valve bore which closes the valve.

In an additional aspect, the invention may provide a method of supplying a fluid (e.g. a lubricant) to a pressurised cavity including the method according described above in which the valve bore is a fluid (e.g. lubricant) conduit.

There now follows a non-limiting example of the invention described with reference to the following drawings.

In the drawings, light items are assigned like reference symbols.

Figure 1:
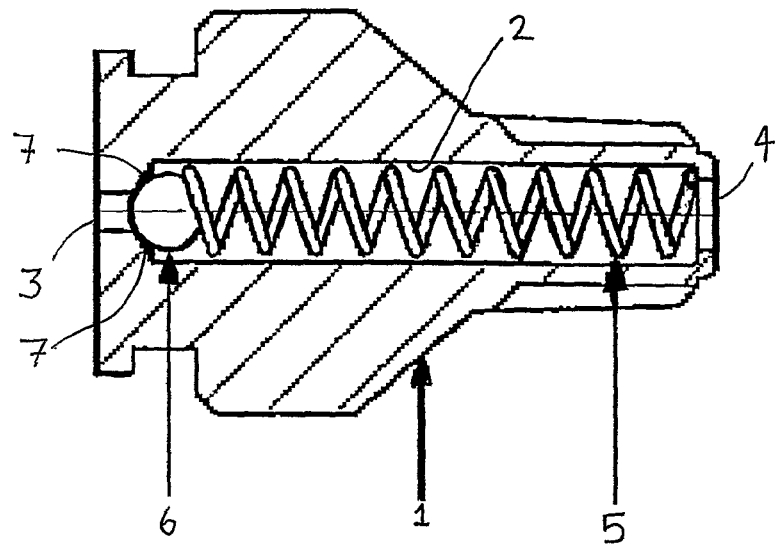
FIG. 1 illustrates a cross-sectional view of a lubrication fitting.
Figure 2:
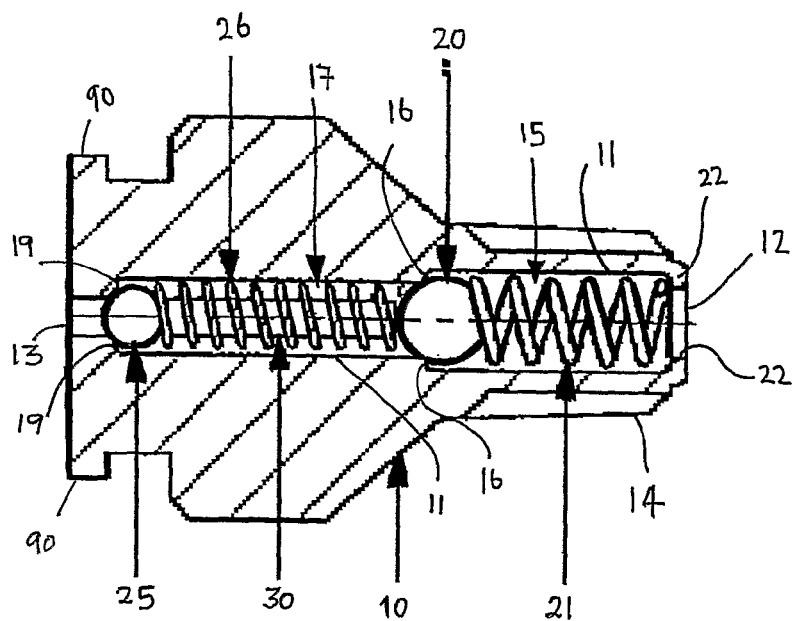
FIG. 2 illustrates a cross-sectional view of a valve operable as a lubrication fitting including a double-check mechanism.

FIG. 2 illustrates a cross-sectional view of a valve according to an embodiment of the invention. The valve includes a valve body 10 through which a valve bore 11 passes from a first valve opening 12 to a second valve opening 13.

The outer surface of the valve body adjacent and surrounding the first valve opening defines nozzle 14 extending along a direction parallel with the axis of the valve bore. The outer surface of the nozzle is threaded to enable the nozzle to be coupled into a reciprocally threaded aperture of a vessel or cavity wall so as to couple the valve body to the vessel or cavity and to form a sealing fit therewith. The terminal end surface of the nozzle is shaped to define the first valve opening which serves, in use, to admit into the valve bore substances (e.g. pressurised fluid) from within the vessel or cavity to which the valve is coupled, and to admit into the vessel or cavity substances (e.g. lubricant) to be injected into the vessel or cavity via the valve.

The second valve opening, at an end of the valve bore opposite to that at which the first valve opening is defined, provides an opening, in use, to admit substances (e.g. lubricant) into the valve bore for injection into a cavity or vessel and to exude substances (e.g. pressurised fluid) emanating from the cavity or vessel via the valve.

The valve bore includes a first bore length 15 extending linearly from the first valve opening towards the second valve opening, being of uniform circular cross-section and diameter along that length. The first bore length terminates at a first valve seat 16 formed by a reduction in the diameter of the valve bore which defines an end of a second bore length 17. In this way the junction between the first and second bore lengths defines a circumferential step of shoulder 16 within the inner bore surface at which the diameter of the bore reduces.

The second bore length 17 extends linearly from the first valve seat 16 towards the second valve opening and is uniformly circular in cross-section along that length. The second bore length terminates at a second valve seat 19 formed by a reduction in the diameter of the valve bore which defines the second valve opening. Thus, the junction between the second bore length and the second valve opening defines a circumferential shoulder or step 19 within the bore surface at which the diameter of the bore reduces.

A first ball 20 is located within the first bore length and has a diameter which is less than the diameter of the first bore length, but greater than the diameter of the second bore length. A helical spring 21 is housed within the first bore length and engages a surface of the first ball at one spring end. The opposite end of the first spring is seated, and engages, a circumferential step, shoulder or lip 22 formed by a narrowing of the diameter of the valve bore which defines the first bore opening. The long axis of the first helical spring extends along the axis of the first bore length from the first bore opening to a facing surface of the first ball and is in a state of compression. The compressed spring urges against the facing surface of the first ball so as to urge the first ball towards the second valve opening and against the first valve seat thereby to form a sealing interface therewith to place the first bore length in fluid isolation from the second bore length—thereby to close the valve.

The diameters of both the first ball and the first helical spring are such as to permit each (or parts thereof) to move along the first bore length away from the first valve seat to permit a flow of fluid, or other flowing substance, around them and along the valve bore (unless the first ball is seated at the first valve seat).

Thus, the first bore length, the first valve seat, the first ball and first helical spring collectively define a first check-valve which, in its quiescent state, acts to close the valve to prevent a flow of substance from the first valve opening to the second valve opening until the first ball is unseated from the first valve seat.

A second ball 25 (smaller than the first ball) is located within the second bore length and has a diameter which is less than the diameter of the second bore length but greater than the diameter of the second valve opening at the second valve seat.

A second helical spring 26 is housed within the second bore length and, at one of its ends, engages a facing surface of the second ball, while, at the other of its ends, it engages a facing surface of the first ball. The long axis of the second helical spring extends along the axis of the second bore length from the first ball to the second ball and is in a state of compression so as to urge the second ball towards the second valve opening, and against the second valve seat, when the first ball is against the first valve seat. When so urged against the second valve seat, the second ball forms a sealing interface therewith, so as to place the second bore length in fluid isolation from the second valve opening—thereby to close the valve.

The diameters of the second ball and second helical spring are such as to permit each (or a part thereof) to move along the second bore length away from the second valve seat and to permit a flow of fluid, or the like, around them and along the valve bore when the valve is open. In this way, the second bore length, second valve seat, second ball and second helical spring act together to define a second check-valve which, in its quiescent state, acts to close the valve to prevent a flow of substance from the first valve opening to the second valve opening. The valve is maintained closed until the second ball is unseated from the second valve seat.

A rigid pin 30 is located within the second bore length intermediate the first ball and the second ball, and is housed or caged within the windings of the second helical spring. The pin extends along the long axis of the second helical spring and of the second bore length. The length of the rigid pin matches the separation of opposing nearmost surfaces of the first ball and second ball when each are seated in their respective valve seats. Consequently, when both the first ball and second ball are seated to individually close the valve, the intermediate rigid pin touches, or is at least intimately close to, opposing surfaces of the two balls. A movement of the second ball away from the second valve seat and towards the first ball is transmitted along the intermediate rigid pin to the first ball thereby to urge an unseating of the first ball from the first valve seat to simultaneously open the valve.

In this way, the double-check valve may be opened by acting directly upon only the second-check valve, accessible through the second valve opening, which acts to open the first check-valve, via the intermediate pin, to substantially simultaneously open the first check-valve (which is otherwise inaccessible when used).

Each of the first and second balls may be a metal sphere. The surface of the first and/or second valve seat may be inclined relative to the axis of the valve bore so as to present to a respective first and/or second ball a flat or continuous surface tangential to the surface of the ball when seated thereat. This may assist in forming a sealing interface between the valve seat and the seated ball.

Figure 3:
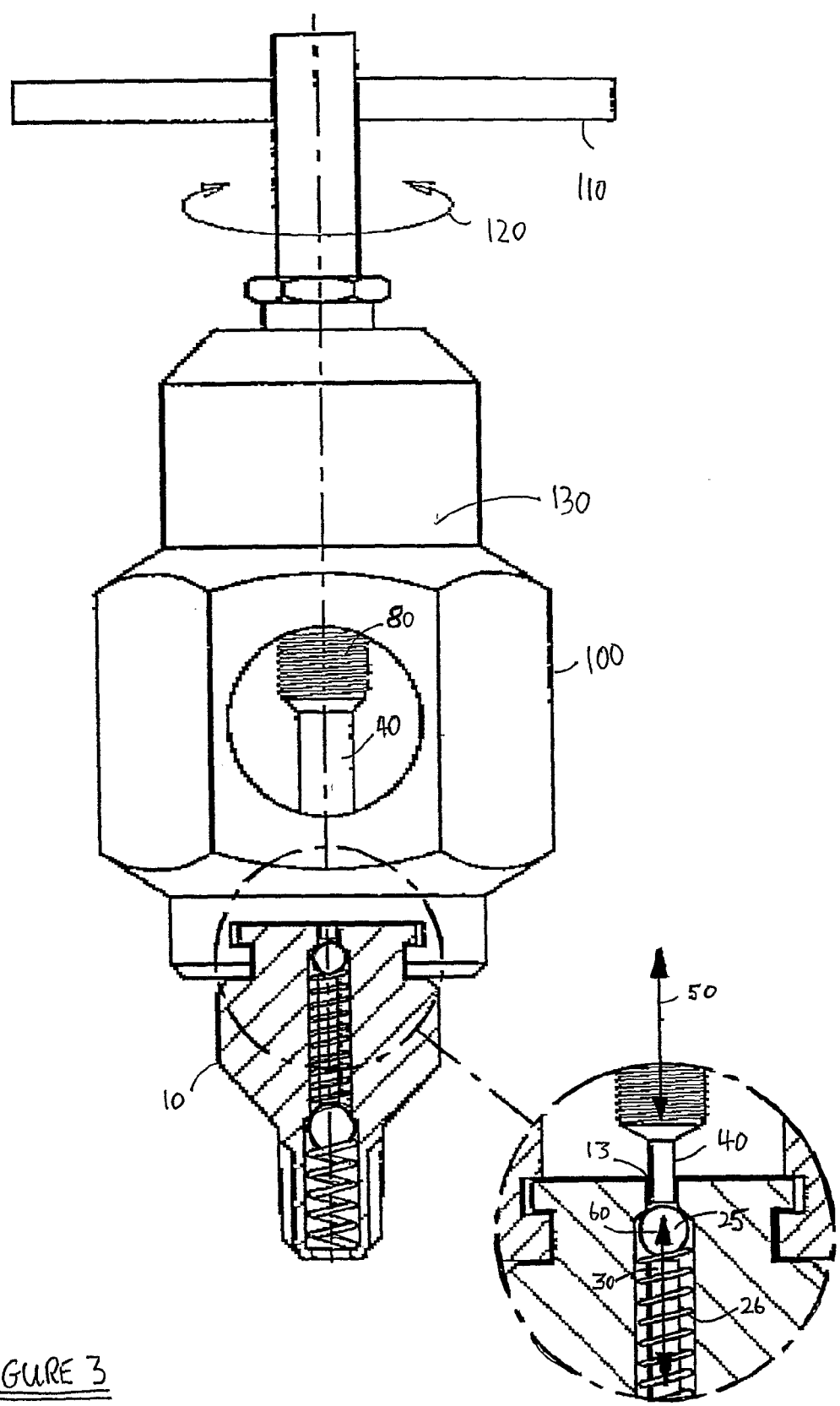
FIG. 3 illustrates the valve of FIG. 2 together with a means for opening the valve (e.g. a "stinger").

In use, a rod 40 may be inserted into the closed valve 10 via the second valve opening 13 (as is shown in FIG. 3) so as to urge the second ball 25 away from its valve seat, and simultaneously to unseat the first ball, thereby to open the valve.

FIG. 3 illustrates a typical valve opening tool 100 arranged for opening the valve 10. The opening tool comprises a hollow body 130 through which passes a rod 40 passes from a distal opening beyond which a handle-bearing end 110 of the rod protrudes, to an operative end at which is formed an aperture exposing a terminal operative end of the rod. The aperture of the opening tool is dimensioned to admit an end of the valve 10 containing the second valve opening, from which end flanges outwardly project in opposite directions transverse to the axis of the valve bore. Opposing grooves formed in the body of the opening tool adjacent the operative end of the tool and extending transversely to the axis of the rod, are arranged and dimensioned to simultaneously intimately admit and fit to a respective flange of the valve end thereby to hold the valve to the operative end of the tool with the axis of the rod collinear with the axis of the valve bore.

The terminal operative end of the rod 40 is dimensioned to be admissible into the valve bore via the second valve opening and to be moveable along the axis of the valve bore to engage with a facing surface of the second ball 25 seated at the second valve seat. The rod is further moveable to unseat the second ball from the second valve seat and, in so doing indirectly unseat the first ball from the first valve seat thereby to open the valve.

The external surface of a length 80 of the rod 40 intermediate the ends of the rod, is threaded and engages a reciprocally threaded bore (not shown) such that a clockwise (or anti-clockwise) turning 120 of the handle-bearing end 110 of the rod results in a linear movement 50 to project (or retract) the terminal operative end of the rod. When the terminal end of the rod is engaged with the second ball 25 of the valve as shown in FIG. 3, this projection (retraction) results in a corresponding linear movement 60 of the second ball, the intermediate pin 30 and the second ball 20 along the valve bore to unseat (or reseat) both balls and to open (or close) the valve.

In normal use, and when retaining medium to high-pressure fluids, the body 10 of the valve may be made from low alloy steel such as AISI 4140, the two spherical balls may be made from stainless steel or a corrosion resistant ally such as Inconel. The intermediate rigid pin may be made from a stainless steel such as AISI 316 or bronze.

The above embodiments are intended as non-limiting examples of the invention and variants or modifications of these embodiments such as would be readily apparent to the skilled person are encompassed within the invention.

The invention claimed is:

1. A valve including:
   a valve body through which a valve bore passes from a first valve opening to a second valve opening;
   a first closure member moveable within the valve bore to close the valve;
   a second closure member moveable within the valve bore to concurrently close the valve when the valve is also closed by the first closure member;
   a rigid intermediate member within the valve bore between the first closure member and the second closure member and moveable by action of movement of the second closure member to urge movement of the first closure member to render the first valve opening in fluid communication with the second valve opening, wherein a length of the intermediate member matches a separation of opposing nearmost surfaces of the first and second closure members when both the first and second closure members are in a respective position within the valve bore which closes the valve; and
   a first biasing member disposed within the valve bore, the first biasing member having a first end in contact with the first closure member and a second end in contact with the second closure member;
   wherein the first biasing member is configured to bias the first closure member away from the second closure member.

2. The valve according to claim 1 in which the rigid intermediate member is dimensioned to be in contact with both the first closure member and the second closure member only after the second closure member is displaced from a position within the valve bore which closes the valve.

3. The valve according to claim 1 wherein the rigid intermediate member has an axially transverse width less than the width of the valve bore.

4. The valve according to claim 1 in which the rigid intermediate member is a metal rod.

5. The valve according to claim 1 in which the valve bore defines a first valve seat and the first closure member is moveable within the valve bore to engage the first valve seat and dimensioned to close the valve when so seated.

6. The valve according to claim 5 in which the rigid intermediate member is moveable by action of a movement of the second closure member towards the first valve seat to urge movement of the first closure member away from the first valve seat.

7. The valve according to claim 5 in which the valve bore defines a second valve seat and the second closure member is between the first and second valve seats and is moveable within the valve bore to engage the second valve seat and dimensioned to close the valve when so seated.

8. The valve according to claim 1 in which the valve is a check valve.

9. The valve according to claim 1 in which the valve is selected from the group consisting of a gate valve, a plug valve, a globe valve, and a ball valve.

10. The valve of claim 1, further comprising a second biasing member disposed within the valve bore, the second biasing member being configured to bias the first closure member toward the second closure member.

11. The valve of claim 10, wherein the second biasing member has a compression strength that is greater than a compression strength of the first biasing member.

12. A lubrication fitting including:
   a valve including,
      a valve body through which a valve bore passes from a first valve opening to a second valve opening, and in which the valve bore is a lubricant conduit,
      a first closure member moveable within the valve bore to close the valve,
      a second closure member moveable within the valve bore to concurrently close the valve when the valve is also closed by the first closure member,
      a rigid intermediate member within the valve bore between the first closure member and the second closure member and moveable by action of movement of the second closure member to urge movement of the first closure member to render the first valve opening in fluid communication with the second valve opening, wherein a length of the intermediate member matches a separation distance between the first and second closure members when both the first and second closure members are in a respective position within the valve bore which closes the valve; and
      a first biasing member disposed within the valve bore, the first biasing member having a first end, a second end, and an axial length measured from the first end to the second end;
      wherein the axial length of the first biasing member is equal to the separation distance between the first closure member and the second closure member.

13. The valve member of claim 12, further comprising a second biasing member disposed within the valve bore, the second biasing member being configured to bias the first closure member toward the second closure member.

14. The valve member of claim 13, wherein the second biasing member has a compression strength that is greater than a compression strength of the first biasing member.

15. A method for controlling fluid communication with a pressurized region, the method comprising:
engaging a first closure member with a first valve seat disposed within a valve bore of a valve body;
engaging a second closure member with a second valve seat disposed within the valve bore;
biasing the first closure member away from the second closure member with a first biasing member, wherein the first biasing member has a first end in contact with the first closure member and a second end in contact with the second closure member; and
moving the second closure member from the second valve seat;
moving the first closure member from the first valve seat simultaneous with moving the second closure member from the second valve with a rigid intermediate member extending between the second closure member and the first closure member.

16. The method of claim 15, further comprising:
biasing the first closure member toward the first valve seat with a first biasing force;
biasing the first closure member away from the second closure member with a second biasing force that is less than the first biasing force.

17. The method of claim 15, further comprising:
relieving pressure from the pressurized region while disengaging the second closure member from the second valve seat and disengaging the first closure member from the first valve seat.

18. The method of claim 17, further comprising:
supplying a lubricant to the pressurized region through the valve bore.

* * * * *

UNITED STATES PATENT AND TRADEMARK OFFICE
CERTIFICATE OF CORRECTION

PATENT NO. : 8,656,946 B2  Page 1 of 1
APPLICATION NO. : 12/601464
DATED : February 25, 2014
INVENTOR(S) : Anderson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1055 days.

Signed and Sealed this

Twenty-ninth Day of September, 2015

Michelle K. Lee
*Director of the United States Patent and Trademark Office*